United States Patent Office.

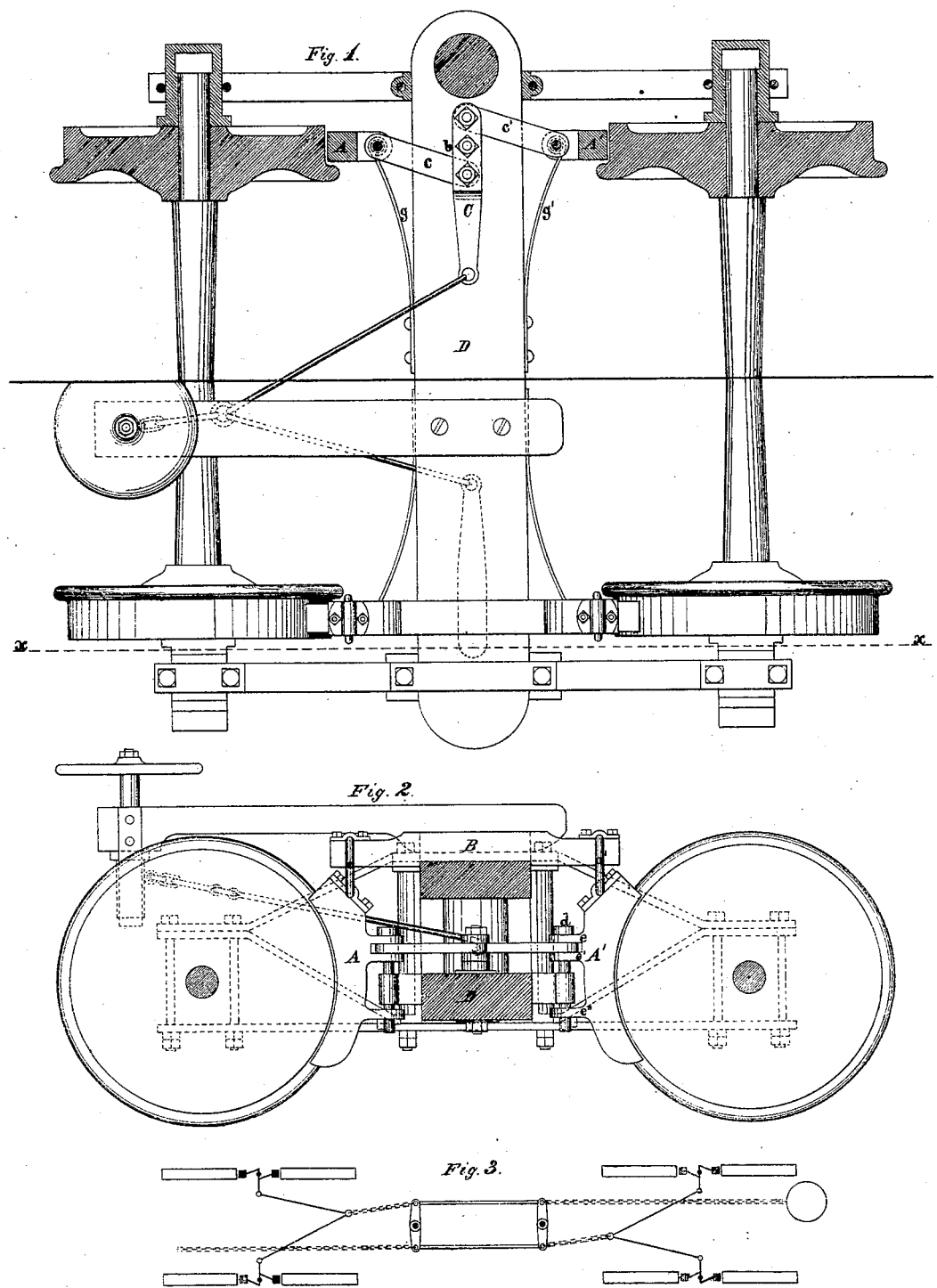

CALVIN A. SMITH, OF JERSEY CITY, NEW JERSEY.

Letters Patent No. 114,983, dated May 16, 1871.

IMPROVEMENT IN CAR-BRAKES.

The Schedule referred to in these Letters Patent and making part of the same.

*To all whom it may concern:*

Be it known that I, CALVIN A. SMITH, of Jersey City, county of Hudson, in the State of New Jersey, have invented a new and useful Improvement in Railroad-Car Brakes, of which the following is a specification, reference being had to the accompanying drawing forming part thereof.

Figure 1 is a top view of a car-truck, partly in section, with my improved brake attached.

Figure 2 is a vertical section of the same cut through on the dotted line $x\ x$ in fig. 1.

My invention consists in operating the brakes for each pair of wheels on the same side of a railway truck directly and without a brake-beam by a single horizontal lever pivoted to the transom of the truck, between and on a line with the wheels, when each brake is connected with a spring that serves the double purpose of assisting to support the brake-block and of taking the brake off from the wheel when liberated from the action of the lever.

A A' are the brakes for one pair of wheels on the same side of the truck.

They are suspended between the wheels, from the opposite ends of the cross-bar B, by the links $a\ a'$.

C is a lever pivoted at $b$ upon a cross-beam, D, forming part of the frame of the truck.

Centrally between and on a line with the wheels, upon each side of the pivot $b$, is an arm, $c\ c'$, connecting each brake with the lever.

Upon each brake are three lugs, $e\ e'\ e''$, the two upper ones of which receive the end of the arm $c$ and a round bolt, $d$, passing through them and down through the lower lug.

$g\ g'$ are broad-leaf steel springs, bolted at one end to the cross-beam D, and at the other end looped around the bolt $d$.

The lever is operated in the ordinary way by a rod connected with the inner end of the lever, having a chain at the opposite end of the rod that is wound around a shaft hung on the platform of the car, as shown in the drawing.

Without further description the construction and operation of my car-brake will be easily and fully understood from the drawing. As will be seen this mode of construction dispenses with the use of the brake-beam, or the beam extending across from side to side of the truck, in front of the wheels, to which the brakes are usually attached, from the falling of which upon the tracks many disastrous accidents have occured.

It will be observed that abundant security is provided against the displacement of the brake. If the link $a$ should break it will still be held securely in position by the spring $g$ and the arm $c$.

The cheapness, simplicity, safety, and entire efficiency of this brake render it very greatly superior to any in use.

One special advantage of this brake ought to be particularly mentioned: it can be operated very much quicker than any other in use—a single half-turn of the brake-wheel will apply the brake fully.

The above arrangement for operating the brake is more especially adapted to freight-cars as at present constructed; but if it is desired to operate the brakes at both ends of the car, as upon passenger-cars, the arrangement may be adopted shown in fig. 3, which will be easily understood without special description.

Claim.

What I claim as my invention, and desire to secure by Letters Patent, is—

The car-brakes A A', the lever C, the arms $c\ c'$, and the springs $g\ g'$, all combined, arranged, and operating substantially as and for the purpose specified.

CALVIN A. SMITH.

Witnesses:
WM. C. REDDY,
J. P. FITCH.